US011197303B2

United States Patent
Wu et al.

(10) Patent No.: US 11,197,303 B2
(45) Date of Patent: Dec. 7, 2021

(54) DIRECT LINK SYNCHRONIZATION SIGNAL BLOCK TRANSMISSION

(71) Applicant: QUALCOMM Incorporated, San Diego, CA (US)

(72) Inventors: Shuanshuan Wu, San Diego, CA (US); Kapil Gulati, Hillsborough, NJ (US); Navid Abedini, Somerset, NJ (US); Sudhir Kumar Baghel, Hillsborough, NJ (US); Arjun Bharadwaj, Cupertino, CA (US); Tien Viet Nguyen, Bridgewater, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/746,433

(22) Filed: Jan. 17, 2020

(65) Prior Publication Data

US 2020/0245341 A1    Jul. 30, 2020

Related U.S. Application Data

(60) Provisional application No. 62/796,564, filed on Jan. 24, 2019.

(51) Int. Cl.
*H04W 72/10* (2009.01)
*H04W 56/00* (2009.01)
(Continued)

(52) U.S. Cl.
CPC ......... *H04W 72/10* (2013.01); *H04W 56/001* (2013.01); *H04W 72/02* (2013.01); *H04W 92/18* (2013.01)

(58) Field of Classification Search
None
See application file for complete search history.

(56) References Cited

U.S. PATENT DOCUMENTS 10,159,054 B2 * 12/2018 Li .................. H04W 76/14
2015/0117375 A1   4/2015 Sartori et al.
(Continued)

FOREIGN PATENT DOCUMENTS

EP   3179789 A1 *  6/2017 ........ H04W 72/0406
EP   3179789 A1    6/2017
(Continued)

OTHER PUBLICATIONS

CATT: "Timing alignment for V2V", 3GPP Draft, R1-164213, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051090052, 4 pages, Retrieved from the Internet: URL: http://www.3gpp.org/ftp/tsg_ran/WG1_RL1/TSGR1_85/Docs/. [retrieved on May 14, 2016] the whole document.

(Continued)

Primary Examiner — Ayanah S George
(74) Attorney, Agent, or Firm — Arent Fox LLP

(57) ABSTRACT

Aspects described herein relate to transmitting a direct link synchronization signal for wireless communications. A user equipment (UE) may determine a synchronization signal priority level. The UE may determine a number of resources in a synchronization signal period on which to transmit a direct link synchronization signal block from the UE based on the synchronization signal priority level. The UE may transmit the direct link synchronization signal block on the number of resources.

30 Claims, 7 Drawing Sheets

(51) Int. Cl.
*H04W 72/02* (2009.01)
*H04W 92/18* (2009.01)

(56) References Cited

U.S. PATENT DOCUMENTS

2015/0327191 A1* 11/2015 Park ............... H04W 56/00
370/350
2018/0255558 A1* 9/2018 Lee ............... H04W 76/14

FOREIGN PATENT DOCUMENTS

| EP | 3322234 A1 * | 5/2018 | ............ H04W 76/14 |
| EP | 3322234 A1 | 5/2018 | |
| WO | 2016161981 A1 | 10/2016 | |

OTHER PUBLICATIONS

International Search Report and Written Opinion—PCT/US2020/014580—ISA/EPO—dated Apr. 21, 2020.

* cited by examiner

DIRECT LINK SYNCHRONIZATION SIGNAL BLOCK TRANSMISSION

CLAIM OF PRIORITY UNDER 35 U.S.C. § 119

This application claims priority to U.S. Provisional Application No. 62/796,564 titled "SIDELINK SYNCHRONIZATION SIGNAL BLOCK TRANSMISSION," filed Jan. 24, 2019, which is assigned to the assignee hereof, and incorporated herein by reference in its entirety.

BACKGROUND

Aspects of the present disclosure relate generally to wireless communication systems, and more particularly, to direct link synchronization signal block transmission in device-to-device (D2D) communication devices, vehicle-based communication devices, and/or the like.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. In addition, 5G NR supports the use of cyclic prefix orthogonal frequency division multiplexing (CP-OFDM) waveforms and discrete Fourier transform spread orthogonal frequency division multiplexing (DFT-S-OFDM) waveforms, as configured by the network. As the demand for mobile broadband access continues to increase, however, further improvements in 5G communications technology and beyond may be desired.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In some cases, direct link communications may be synchronized with a global navigation satellite system (GNSS) or a base station. In other cases, it may be desirable for a UE to transmit a direct link synchronization signal that other UEs may use for synchronization.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for transmitting a direct link synchronization signal for wireless communications is provided. The method may include determining, at a user equipment (UE), a synchronization signal priority level. The method may include determining a number of resources in a synchronization signal period on which to transmit a direct link synchronization signal block from the UE based on the synchronization signal priority level. The method may include transmitting, by the UE, the direct link synchronization signal block on the number of resources.

In another aspect, the disclosure provides an apparatus for wireless communication. The apparatus may include a transceiver; a memory configured to store instructions; and one or more processors communicatively coupled with the transceiver and the memory, wherein the one or more processors are configured to execute the instructions. The one or more processors may be configured to determine, at a UE, a synchronization signal priority level. The one or more processors may be configured to determine a number of resources in a synchronization signal period on which to transmit a direct link synchronization signal block from the UE based on the synchronization signal priority level. The one or more processors may be configured to transmit, from the UE via the transceiver, the direct link synchronization signal block on the number of resources.

In another aspect, the disclosure provides an apparatus for wireless communication. The apparatus may include means for determining, at a UE, a synchronization signal priority level. The apparatus may include means for determining a number of resources in a synchronization signal period on which to transmit a direct link synchronization signal block from the UE based on the synchronization signal priority level. The apparatus may include means for transmitting, by the UE, the direct link synchronization signal block on the number of resources.

In another aspect, the disclosure provides a non-transitory computer-readable medium, comprising code executable by one or more processors. The non-transitory computer-readable medium may include instructions to determine, at a user equipment (UE), a synchronization signal priority level. The non-transitory computer-readable medium may include instructions to determine a number of resources in a synchronization signal period on which to transmit a direct link synchronization signal block from the UE based on the synchronization signal priority level. The non-transitory computer-readable medium may include instructions to transmit, from the UE, the direct link synchronization signal block on the number of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
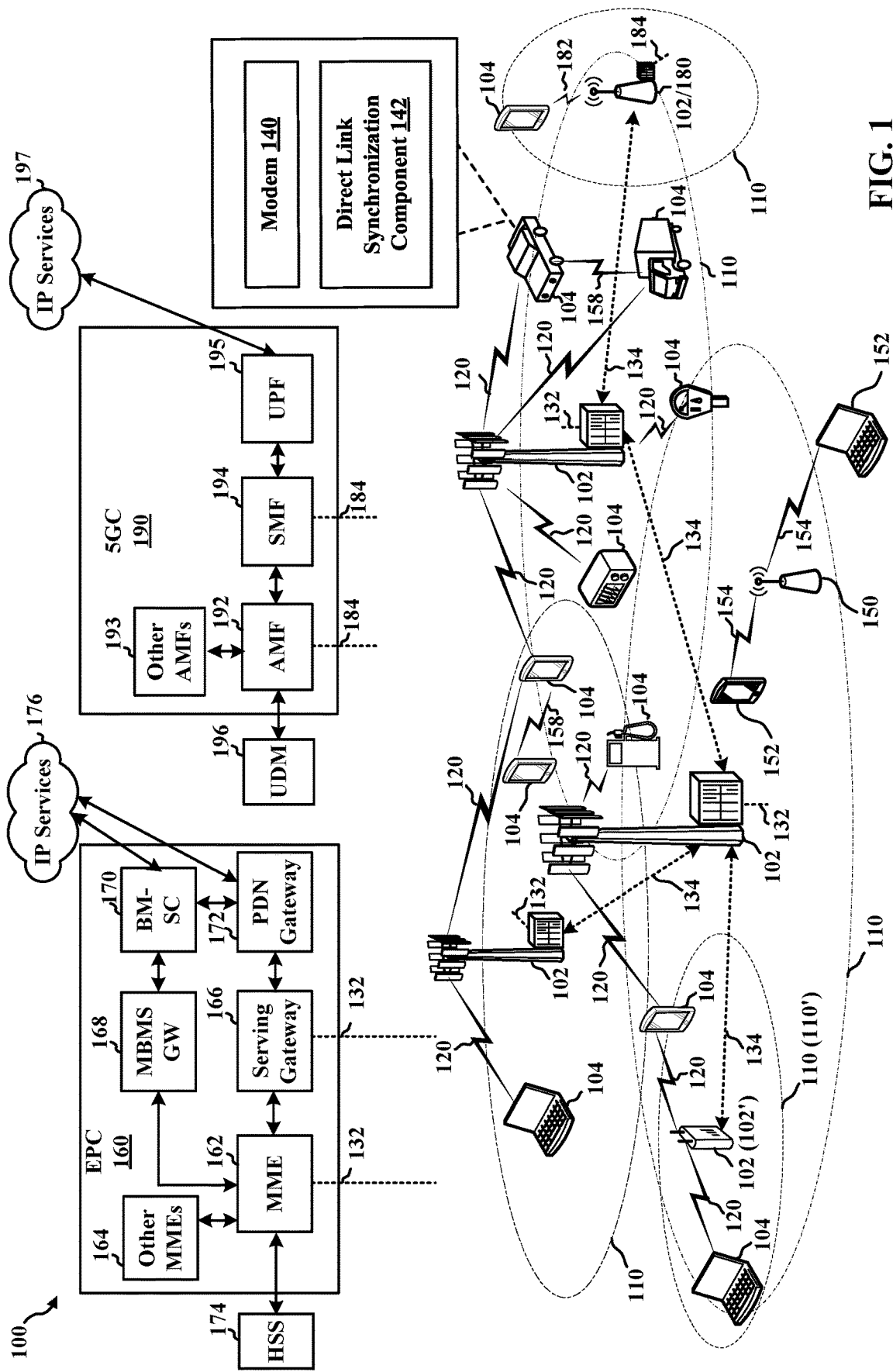
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to synchronization signals for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink, as opposed to communications over the Uu interface (e.g., from gNB to user equipment (UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

Support of synchronization using synchronization signal blocks (SSBs) within synchronization signal periods is provided in 5G NR communication technologies over the Uu interface. A synchronization signal period may also be referred to as a synchronization signal burst. In this regard, the UE may receive SSBs and synchronize with the gNB for other communications. In V2X or other D2D communications, however, the UEs may be out of range of a gNB. In some cases, a GNSS signal may be used for synchronization, but may also be unavailable in some cases. Accordingly, synchronization over a direct link may provide a solution in such scenarios.

In some cases of D2D communications, a reliability of synchronization signals transmitted on a direct link between UEs may vary depending on availability of synchronization signals from a gNB or GNSS. For example, a UE that has received a synchronization signal from a gNB or GNSS may transmit a synchronization signal that is consistent with the gNB or GNSS timing and/or frequency. However, a UE that has received no synchronization signal may also transmit a direct link synchronization signal to allow direct link communications (e.g., to allow the UE to synchronize with other UEs so that it can send data). Thus, in the present disclosure, it may be desirable to prioritize direct link synchronization signals, for example, based on some measure or estimate of reliability (e.g., accuracy). Based on such prioritization, for example, a UE may select and receive a direct link synchronization signal that may prove to be more reliable than one or more other direct link synchronization signals.

Accordingly, aspects described herein relate to techniques for prioritizing direct link synchronization signals. For example, a UE may determine a synchronization signal priority level for a direct link synchronization signal that the UE may transmit. The priority level may be based on the reliability of the synchronization of the UE. For example, the priority level may be based on a source of the synchronization or on a number of hops from an original synchronization source. The UE may prioritize the synchronization signal by transmitting the synchronization signal on a number of resources during a synchronization signal period, where the number of resources may vary based on the priority level. For example, the UE may transmit a high priority synchronization signal using a greater number of resources than the UE would use to transmit a lower priority synchronization signal. That is, the UE may transmit a direct link-synchronization signal block (D-SSB) for the high priority synchronization signal more times within a synchronization signal period that the UE would transmit for a lower priority synchronization signal. Thus, the present disclosure may enable more reliable and more efficient transmission of direct link synchronization signals in D2D communications.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100 including a UE 104. In aspects described herein, UE 104 can include a modem 140 for communicating with other UEs and/or base stations in a wireless network. UE 104 can also include a direct link synchronization component 142 for transmitting a direct link synchronization signal on a number of resources based on a priority level, as described further herein.

The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW gNB. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW gNB 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving.

Figure 6:
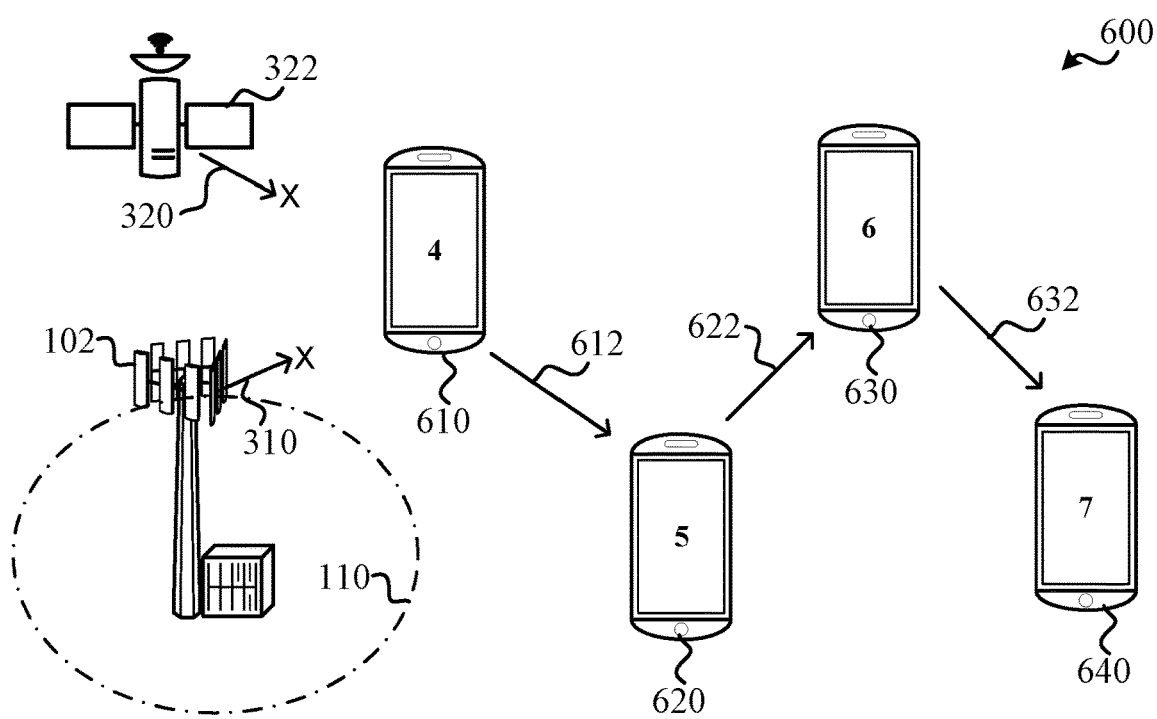
FIG. 6 is a diagram illustrating an example of priority levels based on a number of hops from a self-generated synchronization signal.
Figure 7:
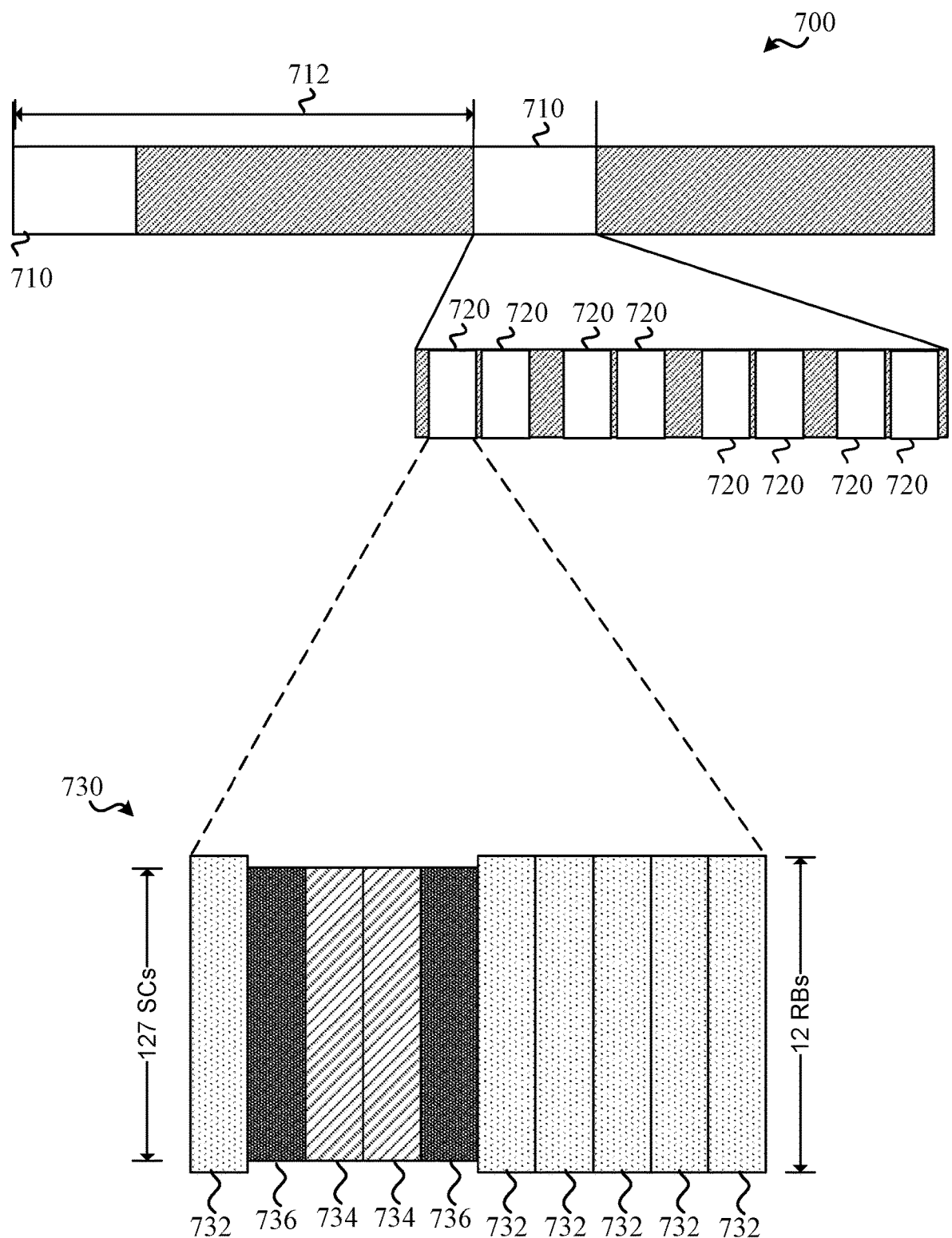
FIG. 7 is a diagram illustrating an example of a direct link synchronization signal block.
Figure 8:
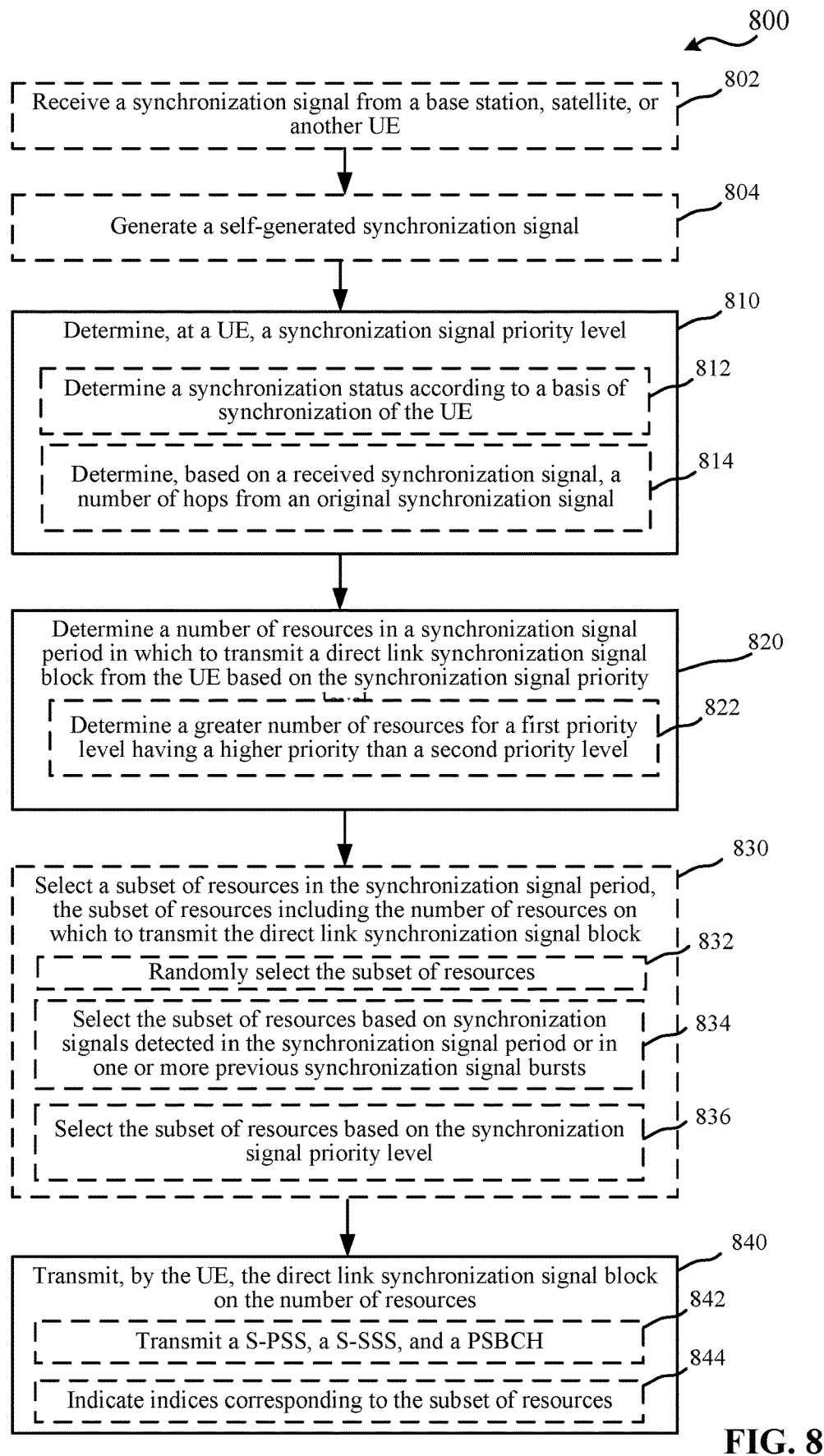
FIG. 8 is a flow chart illustrating an example of a method for transmitting a direct link synchronization block, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below, particularly those of the method in FIG. 8, are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
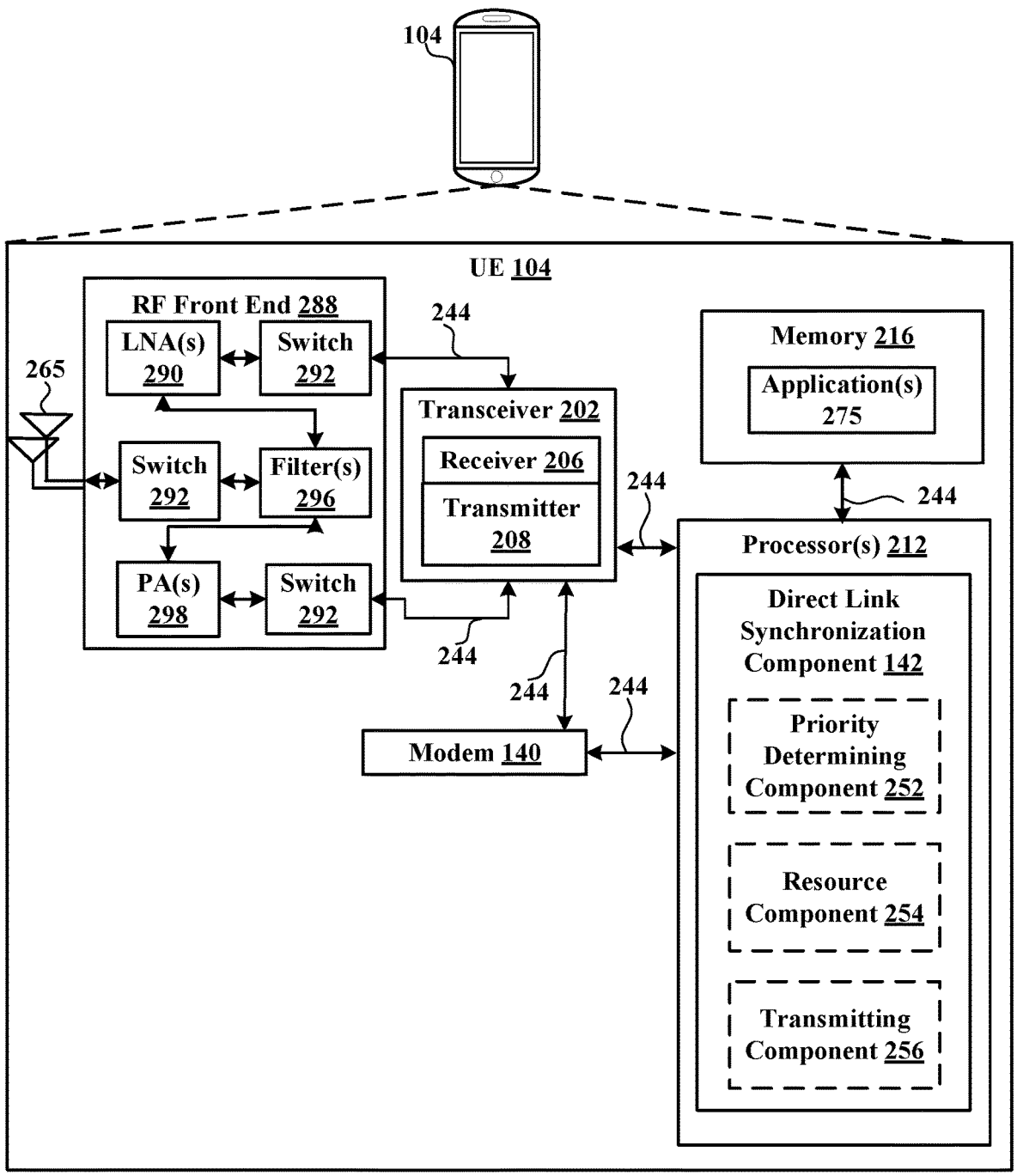
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or direct link synchronization component 142 to enable one or more of the functions described herein related to transmitting a direct link synchronization signal.

In an aspect, the one or more processors 212 can include a modem 140 and/or can be part of the modem 140 that uses one or more modem processors. Thus, the various functions related to direct link synchronization component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with direct link synchronization component 142 may be performed by transceiver 202.

Also, memory 216 may be configured to store data used herein and/or local versions of applications 275 or direct link synchronization component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining direct link synchronization component 142 and/or one or more of its subcomponents, and/or data associated therewith, when UE 104 is operating at least one processor 212 to execute direct link synchronization component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, direct link synchronization component 142 is configured to transmit one or more direct link synchronization signals on a variable number of resources based on a priority level, e.g., related to a source or reliability of the synchronization. The direct link synchronization component 142 can optionally include a priority determining component 252 for determining a synchronization signal priority level to use in transmitting a direct link synchronization signal block (D-SSB) to other UEs or other devices in a wireless network, a resource component 254 for determining a number of resources in a synchronization signal period on which to transmit the D-SSB, and/or a transmitting component 256 for transmitting the synchronization signal to other UEs or other devices in the wireless network. Although illustrated as being associated with the processor 212, it should be understood that the functionality of the direct link synchronization component 142 may alternatively be implemented by the modem 140.

In an aspect, the processor(s) 212 may correspond to one or more of the processors described in connection with the UE in FIG. 9. Similarly, the memory 216 may correspond to the memory described in connection with the UE in FIG. 9.

Figure 3:
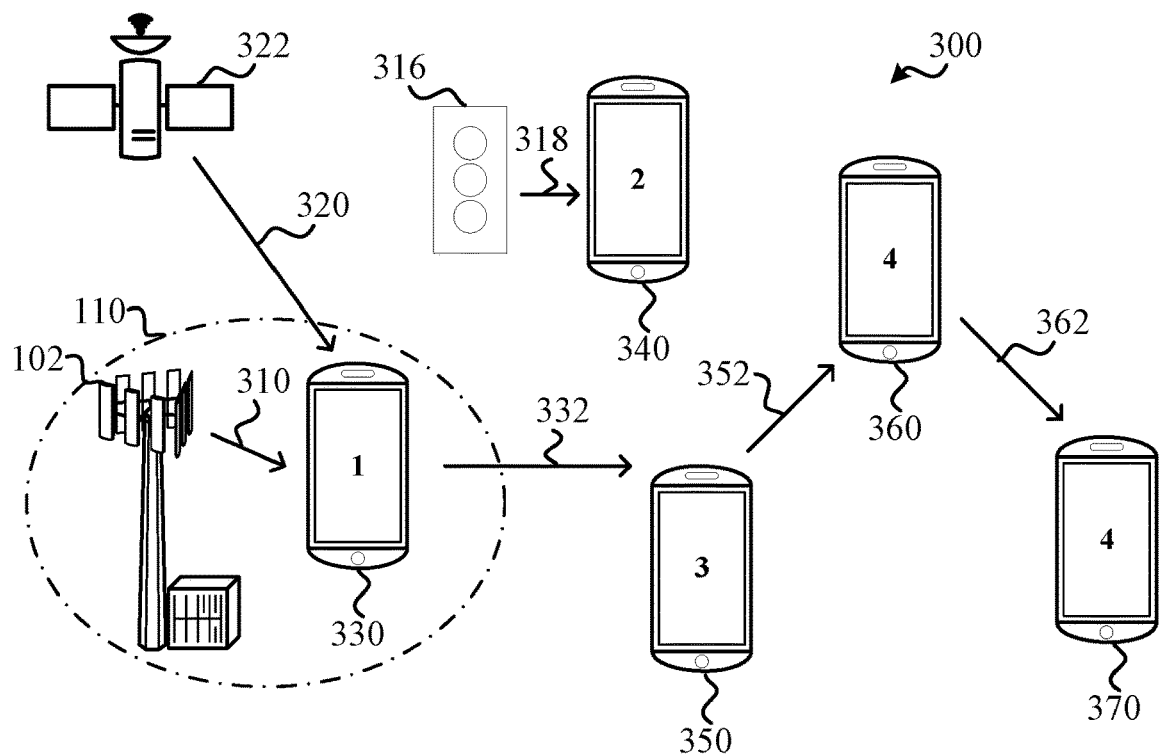
FIG. 3 is a diagram illustrating an example of priority levels based on a synchronization basis of a network or satellite synchronization signal.

Referring to FIG. 3, a diagram 300 includes example priority levels for synchronization signals transmitted by one or more UEs (e.g., UEs 340, 350, 360, and 370) based on a synchronization basis of a network synchronization signal 310 or a satellite synchronization signal 320. It should be noted that UEs 340, 350, 360, and 370 may be the same as or similar to UE 104 of FIG. 1. For example, the network synchronization signal 310 may be transmitted by a base station 102 to a UE 330 within the coverage area 110 of the base station 102. The satellite synchronization signal 320, which may also be received by UE 330, may be transmitted by one or more satellites 322 of a satellite communication system such as a global navigation satellite system (GNSS).

In an aspect, the priority level for a D-SSB transmitted by a UE may be based on a synchronization status determined according to a synchronization basis for the transmitting UE. That is, the priority level may be based on how the UE is synchronized with one or more other devices. A synchronization basis may refer to the synchronization signal upon which synchronization is based. In an aspect, for example, a highest priority level may be for UEs that are directly synchronized with the base station 102 and/or the satellite 322. The UE may be directly synchronized when the UE receives the network synchronization signal 310 or the satellite synchronization signal 320. In an aspect, the highest priority level may be sub-divided into sub-levels based on the type of synchronization signal, e.g., a synchronization status of directly synchronized to a base station and a synchronization status of directly synchronized to a satellite system. For example, the satellite synchronization signal 320 may be given a higher priority than the network synchronization signal 310 when the UE can receive both signals. In another example, the relative priority of the satellite synchronization signal 320 and the network synchronization signal may be defined in a standard, regulation, or higher layer signaling For simplicity, the priority level of UE 330 is illustrated as "1." The illustrated numbers may indicate the priority level as a rank or ordinal numbering with lower numbers indicating a higher priority level. A second highest priority level may be for UEs that are directly synchronized with a road side unit (RSU) 316, e.g., a synchronization status of directly synchronized with a road side unit. The RSU 316 may be considered either a base station or UE depending on implementation. As such, an RSU that is considered a UE may transmit a D-SSB 318. The UE 340 that receives the D-SSB 318 from the RSU 316 may have a priority level of "2." A third highest priority level may be for a UE that synchronizes to another UE, which directly synchronizes to a satellite or base station, e.g., a synchronization status of directly synchronized to another UE that is directly synchronized to a base station or a satellite system. For example, as illustrated, the UE 350 may receive the D-SSB 332 from the UE 330. Since the UE 330 is directly synchronized with the satellite 322 and/or the base station 102, the UE 350 may be considered indirectly synchronized with the satellite 322 and/or the base station 102. Therefore, the UE 350 may have a priority level of "3." A fourth highest priority level may be for a UE that synchronizes to another UE, which itself is indirectly synchronized to a satellite or base station, e.g., a synchronization status of directly synchronized to another UE that is indirectly synchronized to a base station or a satellite system. For example, since the UE 350 is indirectly synchronized with the satellite 322 and/or the base station 102, the UE 360 may have a priority level of "4" because the UE 360 receives a D-SSB 352 from the UE 350. The UE 370, which receives a synchronization signal 362 from the UE 360, may also have a priority level of "4" because the UE 360 is indirectly synchronized with the satellite 322 and/or the base station 102. Similarly, additional UEs (not shown) that receive D-SSBs from UEs indirectly synchronized with the satellite 322 and/or the base station 102 may have a priority level of "4." It should be understood that the above priority levels are examples and that other sets of priority levels or definitions thereof may be used. Additionally, one or more of the priority levels may not be used in a particular deployment (e.g., no RSU 316 may be deployed), and the corresponding priority level may be omitted or no UEs may determine that the corresponding priority level is applicable.

Figure 4:
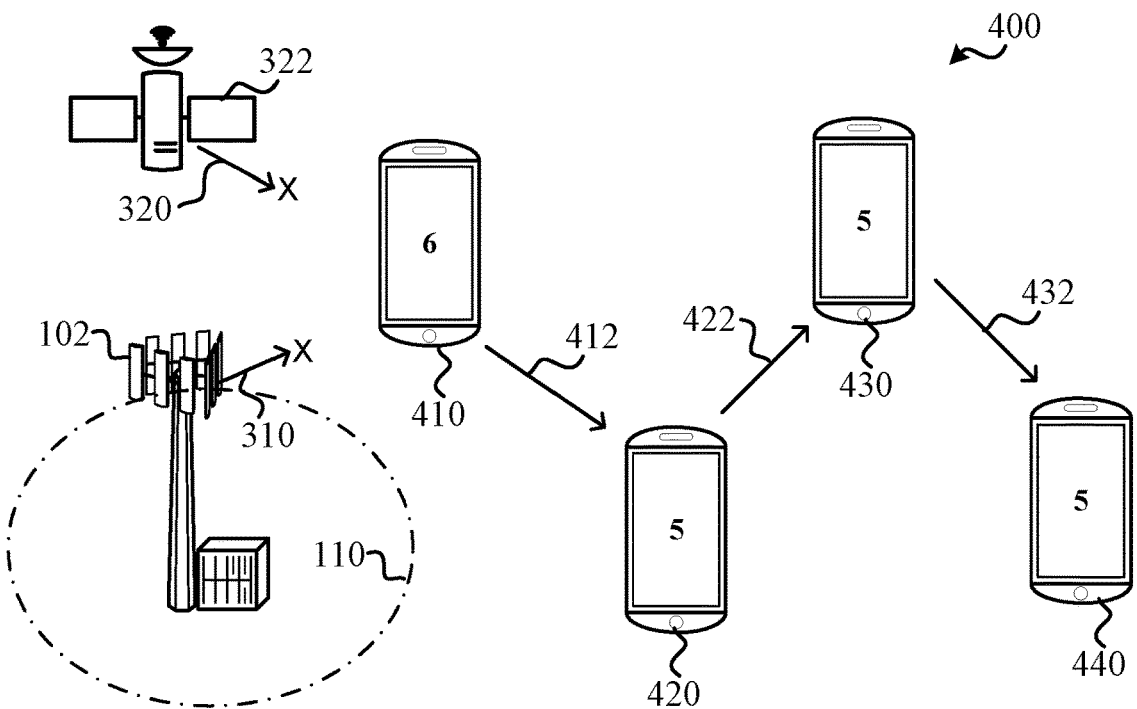
FIG. 4 is a diagram illustrating an example of priority levels based on a synchronization basis of a self-generated synchronization signal.

Referring to FIG. 4, a diagram 400 includes example priority levels for synchronization signals transmitted by one or more UEs (e.g., UEs 410, 420, 430, and 440) based on a synchronization basis of a self-generated D-SSB 412. It should be noted that UEs 410, 420, 430, and 440 may be the same as or similar to UE 104 of FIG. 1. A UE 410 may generate the self-generated D-SSB 412 when the UE 410 is unable to synchronize directly or indirectly with a base station 102 and/or satellite 322. For example, the UE 410 may not receive (as represented by an "X") a network synchronization signal 310, a satellite synchronization signal 320, or a D-SSB from a UE synchronized with either the satellite 322 or base station 102. As such, UE 410 may generate the self-generated D-SSB 412 based on the internal timing and frequency of the UE 410. For example, the UE 410 may determine a frame index by itself and transmit D-SSB 412 based on the determined frame index. In an aspect, the self-generated S-SSB 412 may be considered a lowest priority level, e.g., a synchronization status of transmitting a self-generated synchronization signal, because the self-generated D-SSB 412 may only provide synchronization with the UE 410. Accordingly, as illustrated, the UE 410 may have a relatively lowest priority level, such as a priority level of "6" in this case (although it should be understood that any other range of priority levels may be utilized). Correspondingly, any UEs receiving the self-generated D-SSB 412 or that are indirectly synchronized based on the self-generated D-SSB 412 may have a relatively higher priority level, e.g., a synchronization status of directly synchronized to another UE that transmits a self-generated synchronization signal, based on being synchronized with another UE, even if that UE is not synchronized to the satellite 322 or base station 102. For instance, the UE 420 that that receives the self-generated D-SSB 412 from UE 410 may have a priority level of "5." The priority level of the UE 420 may be higher than the priority level of the UE 410 because the UE 420 is synchronized with at least one other UE (e.g., the UE 410). That is, the UE 420 is directly synchronized with another UE, which has no direct or indirect synchronization to a satellite, or base station. Similarly, UEs 430 and 440 that receive D-SSBs 422 and 432, respectively, may also have a priority level of "5" based on being indirectly synchronized to another UE that is not synchronized to the satellite 322 or base station 102.

Figure 5:
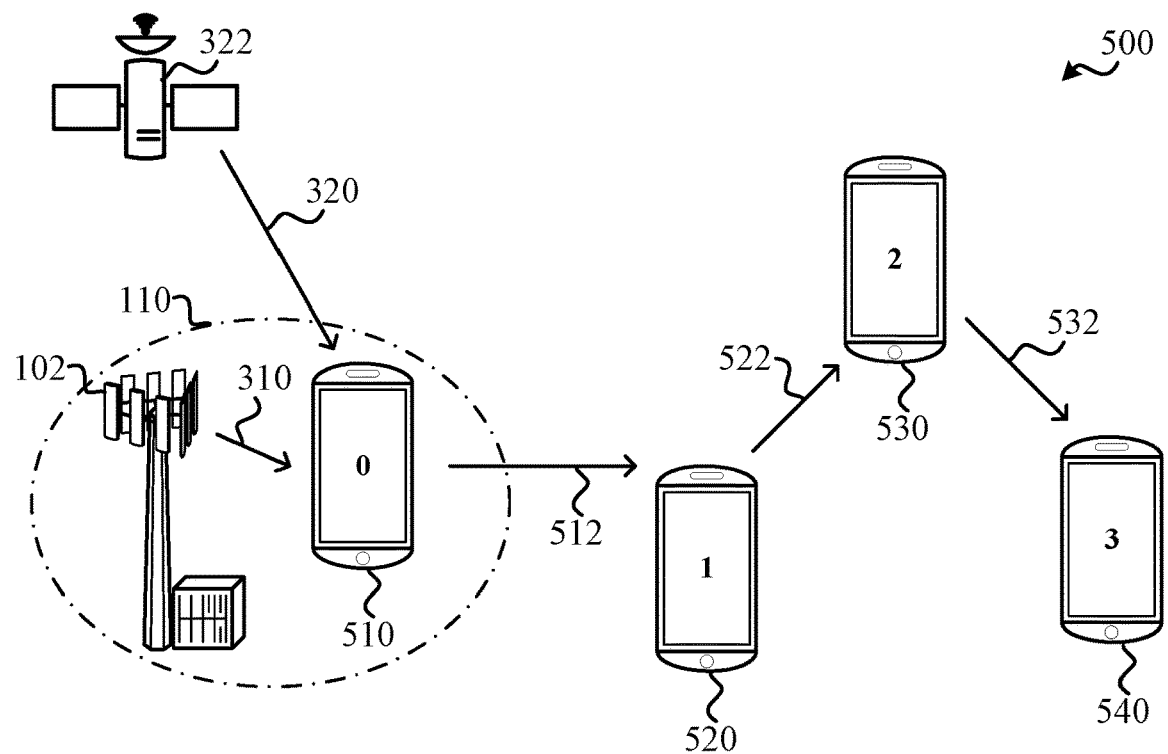
FIG. 5 is a diagram illustrating an example of priority levels based on a number of hops from a network or satellite synchronization signal.

Referring to FIG. 5, a diagram 500 includes example priority levels for synchronization signals transmitted by one or more UEs (e.g., UEs 510, 520, 530, and 540) based on a number of hops from an original synchronization signal. It should be noted that UEs 510, 520, 530, and 540 may be the same as or similar to UE 104 of FIG. 1. For example, the original synchronization signal may be the network synchronization signal 310 or the satellite synchronization signal 320. As above, the network synchronization signal 310 may be transmitted by a base station 102 to a UE 330 within the coverage area 110 of the base station 102, and the satellite synchronization signal 320 may be transmitted by one or more satellites 322 of a satellite communication system to the UE 330.

In this example, the priority level may be the number of hops from the original synchronization signal. The transmitted D-SSBs 512, 522, 532 may indicate the number of hops. For example, the UE 510 may receive the network synchronization signal 310 from the base station 102 or receive the satellite synchronization signal 320 from the satellite 322. Accordingly, the UE 510 may have the highest priority level, which may be illustrated as level "0" indicating no hops because the original synchronization signal was received at the UE 510. The UE 520, which receives the D-SSB 512 may determine a priority level by incrementing the hop count of the transmitting UE 510. Accordingly, the UE 520 may have a priority level of "1" indicating 1 hop from the original synchronization signal. In a similar manner, the UE 530 may have a priority level of "2" indicating 2 hops from the original synchronization signal and the UE 540 may have a priority level of "3" indicating 3 hops from the original synchronization signal. It should be understood that the above priority levels and corresponding hop counters are examples and that other priority levels or hop counters may be used. For example, the hop counter and/or priority level may start at 1 for a UE that receives the original synchronization signal.

In an aspect, the direct link synchronization component 142 may be configured with a maximum number of hops, M. Due to a signal propagation delay, a D-SSB may be less reliable as the number of hops increases. That is, the signal propagation delay may accumulate over multiple hops. The maximum number of hops $M_{threshold}$ may indicate a point where a UE may generate a self-generated synchronization signal. A UE may also generate a self-generated synchronization signal when no synchronization signal is received from a satellite, base station, or other UE. In order to differentiate a self-generated synchronization signal from a synchronization signal indicating a number of hops, the direct link synchronization component 142 may be configured with a value N that is greater than or equal to $M_{threshold}$. A self-generated synchronization signal may indicate N hops. A UE receiving the self-generated synchronization signal (or another direct link synchronization signal based on the self-generated synchronization signal) may subtract N from the indicated number of hops to determine the number of hops from the self-generated synchronization signal.

Referring to FIG. 6, for example, the diagram 600 includes example priority levels for synchronization signals transmitted by one or more UEs (e.g., UEs 610, 620, 630, and 640) based on a number of hops from a self-generated D-SSB 612. It should be noted that UEs 610, 620, 630, and 640 may be the same as or similar to UE 104 of FIG. 1. The UE 610 may generate the self-generated D-SSB 612 when the UE 610 receives no synchronization signal (as represented by an "X") from the base station 102, the satellite 322, or another UE. Additionally, the UE 610 may generate the self-generated D-SSB 612 when every received D-SSB indicates a number of hops greater than or equal to $M_{threshold}$. For example, as illustrated, N may be configured with a value of 4, which may be equal to $M_{threshold}$. Accordingly, the UE 610 may have a priority level of "4." The UE 620 may receive the self-generated D-SSB 612, which may indicate the priority level of 4, and determine that the self-generated D-SSB 612 is a self-generated synchronization signal by subtracting N from the received priority level of 4 to indicate 0 hops. The UE 620 may increment the received priority level and have a priority level of "5," which may be indicated by the D-SSB 622. In a similar manner, the UE 630 may have a priority level of "6" and the UE 640 may have a priority level of "7."

In an aspect, a UE may use the $M_{threshold}$ determine whether to transmit an D-SSB based on a detected D-SSB. For example, the hop number may be capped at the $M_{threshold}$. For instance, when the determined hop counter or priority level of the detected D-SSB is $M_{threshold}$, the UE may 1) still synchronize but not transmit D-SSB based on the detected D-SSB; 2) still synchronize as well as transmit a D-SSB based on the detected D-SSB, but the priority level may not increase; or 3) not synchronize with the detected D-SSB and send self-generated D-SSB if the UE has a data packet to send.

FIG. 7 is a resource diagram 700 illustrating an example D-SSB 730 that may be transmitted by UE 104. In an aspect, transmission of the D-SSB 730 may be similar to transmission of a downlink synchronization signal block by a base station 102 according to 3GPP 5G NR standards. The D-SSB 730 may be transmitted within a synchronization signal period 710 having a periodicity 712. Although the synchronization signal period 710 is shown at the start of a period, the synchronization signal period 710 may occur at any designated time within the period. The synchronization signal period 710 may include multiple synchronization signal resources 720 that a UE may use to transmit zero or more D-SSBs 730. For example, the illustrated synchronization signal period 710 includes 8 synchronization signal resources 720, which may be referred to by indices 0-7. It should be understood, however, that synchronization signal period 710 and D-SSB 730 are only one example of many different possible configurations of synchronization information.

The direct link synchronization component 142 may execute the resource component 254 to determine which synchronization signal resources 720 to use for transmitting the D-SSB 730. The resource component 254 may determine a number, $L_{tx}$, of synchronization signal resources 720 to use based on the priority level of the transmitting UE. Generally, a UE having a higher priority level of D-SSB transmission may use a greater number of synchronization signal resources 720. In an aspect, for example, each priority level may be mapped to a value of $L_{tx}$. For example, the mapping may be defined by a standard, regulation, network operator, or higher layer signaling (e.g., RRC). In a first example mapping, a priority level of 1 may map to an $L_{tx}$ value 4, a priority level of 2 may map to an $L_{tx}$ value of 2, and a priority level of 3-5 may map to an $L_{tx}$ value of 1. In a second example mapping a priority level of 1 may map to an $L_{tx}$ value of 8, and a priority level greater than 1 may map to an $L_{tx}$ value of 2.

In an aspect, the resource component 254 may also select a subset of the synchronization signal resources 720 on which to transmit the D-SSB 730. The subset may include the number of synchronization signal resources 720 determined based on the priority. That is, the resource component 254 may determine which particular synchronization signal resources 720 to use for the D-SSB 730. In an aspect, the resource component 254 may randomly select the $L_{tx}$ synchronization signal resources 720. For example, the resource component 254 may perform the random selection every P periods, where P is 1 or greater. The parameter P may be defined in a standards document, regulation, and/or configured via higher layer signaling. As another example, the resource component 254 may randomly select the $L_{tx}$ synchronization signal resources 720 in response to detecting a synchronization signal from another source (e.g., a base station 102 or satellite 322. That is, the resource component 254 may receive the network synchronization signal 310 (which may have been previously unavailable), determine a new priority level based on the detected synchronization signal, and randomly select synchronization signal resources 720. In another aspect, the resource component 254 may select the $L_{tx}$ synchronization signal resources 720 based on signals detected during the synchronization signal period 710 or in one or more previous synchronization signal periods 710. For example, the resource component 254 may select the $L_{tx}$ synchronization signal resources 720 having the least congestion (e.g., lower RSSI). For instance, synchronization signals may be received on a first subset of the synchronization signal resources 720, and the resource component 254 may select a second subset of the synchronization signal resources 720 for transmission. In another example, the resource component 254 may select the $L_{tx}$ synchronization signal resources 720 based on a SLSSID received during a previous synchronization signal period 710. In another aspect, the resource component 254 may select the $L_{tx}$ synchronization signal resources 720 based on the synchronization priority. For example, the mapping from the priority level may define the specific synchronization signal resources 720 in addition to the $L_{tx}$ value. The mapping may define different subsets of synchronization signal resources 720 for each priority level. For example, referring back to FIG. 3, the UE 330 with priority level 1 may transmit on the first 4 D-SSB resources 720 in the D-SSB period 710, the UE 340 with priority level 2 may transmit on the fifth and sixth D-SSB resources 720, the UE 350 may transmit on the seventh D-SSB resource 720, and the UEs 360 and 370 may transmit on the eighth D-SSB resource 720. Referring back to FIG. 4, each of the UEs 410, 420, 430, 440 may transmit on the seventh D-SSB resource 720, according to this example. Referring back to the second mapping example above and FIGS. 3 and 4, the UE 330 may transmit on all eight D-SSB resources 720, and each of the other priority levels may be assigned two different D-SSB resources 720. For example, priority level 2 may be assigned D-SSB indices {0, 4}, priority level 3 may be assigned D-SSB indices {1, 5}, priority level 4 may be assigned D-SSB indices {2, 6}, and priority levels 5 and 6 may be assigned D-SSB indices {3, 7}. In an aspect, the UEs having higher priority levels may indicate a different SLSSID on the respective D-SSB 730.

The D-SSB 730 may include, for example, a physical sidelink broadcast channel (PSBCH) 732, sidelink primary synchronization signal (S-PSS) 734, and sidelink secondary synchronization signal (S-SSS) 736. The S-PSS 734 may be selected from one or more defined sequences. The S-SSS 736 may be selected from one or more defined sequences. Together, the S-PSS and S-SSS sequences may indicate a sidelink synchronization signal identity (SLSSID). In an aspect, D-SSBs 730 having the same priority level and/or having same original synchronization source and/or transmitting in the same D-SSB resource may use the same SLSSID and the transmitted signals may be combined over the air. In an aspect, within a D-SSB period 710, the PSBCHs 732 may be the same in D-SSBs 730 transmitted by the same UE. In an aspect, within a D-SSB period 710, the PSBCHs 732 may be the same in D-SSBs transmitted by UEs with the same priority level. In an aspect, within a D-SSB period 710, the PSBCHs 732 may be the same in one D-SSB resource 720, e.g., when multiple UEs transmit D-SSBs in the same resource, the PSBCH contents are the same, and the PSBCH contents may be different in different D-SSB resources. In an aspect, two PSBCHs 732 may be the same when PSBCH demodulation reference symbol (DMRS) sequences are the same, values of parameters in the PSBCHs 732 are the same, and/or scrambling sequences of the PSBCHs 732 are the same.

FIG. 8 illustrates a flow chart of an example of a method 800 for transmitting a direct link synchronization signal block (D-SSB) for wireless communications. In an example, a UE 104 can perform the functions described in method 800 using one or more of the components described in FIGS. 1 and 2.

The method 800 may optionally include, at block 802, receiving a synchronization signal from a base station, satellite, or another UE. In an aspect, for example, the direct link synchronization component 142 may control the transceiver 202 and/or receiver 206 to receive the synchronization signal from the base station 102, satellite 322, or the other UE. For example, the synchronization signal may be a network synchronization signal 310 from the base station 102, the satellite synchronization signal 320 from satellite 322, or a direct link synchronization signal (e.g., D-SSB 318, 332, 352, 362, 412, 422, 432, 512, 522, 532, 612, 622, 632). The direct link synchronization component 142 may receive multiple direct link synchronization signal blocks and combine the received direct link synchronization signal blocks. Accordingly, the UE 104, the transceiver 202 and/or the receiver 206 executing the direct link synchronization component 142 may provide means for receiving a synchronization signal from a base station, satellite, or another UE.

At block 804, the method 800 may optionally include generating a self-generated synchronization signal. In an aspect, for example, the direct link synchronization component 142 may generate a self-generated synchronization signal (e.g., D-SSB 412, 612). The direct link synchronization component 142 may generate the self-generated synchronization signal in response to either not receiving a synchronization signal, or receiving a synchronization signal that indicates a number of hops greater than the $M_{threshold}$. A self-generated synchronization signal may be a synchronization signal that is not based on synchronization of the UE 104 with another device. Accordingly, the UE 104 and/or the processors 212 executing the direct link synchronization component 142 may provide means for generating a self-generated synchronization signal.

At block 810, the method 800 may include determining, at the UE, a synchronization signal priority level. In an aspect, for example, the direct link synchronization component 142 may execute the priority determining component 252 to determine, at the UE 104, a synchronization signal priority level. The synchronization signal priority level may correspond to a D-SSB to be transmitted by the UE 104. In an aspect, at sub-block 812, block 810 may include determining a synchronization status according to a basis of synchronization of the UE. For example, the priority determining component 252 may determine the synchronization status according to the basis of synchronization of the UE. In certain instances, for example, a status of synchronization with a downlink synchronization signal from a base station, satellite or other non-terrestrial device may correspond to a relatively higher (possibly a highest) priority level while a status of transmitting a self-generated synchronization signal or the like may correspond to a basis of synchronization having a relatively lower (possibly a lowest priority) level. In another aspect, at sub-block 814, the block 810 may include determining, based on a received synchronization signal, a number of hops from an original synchronization signal. For example, the priority determining component 252 may determine, based on the received synchronization signal, a number of hops from an original synchronization signal. The received synchronization signal may indicate the number of hops in the PSBCH 732 or based on a selected SLSSID. Accordingly, the UE 104 and/or the processors 212 executing the direct link synchronization component 142 and/or the priority determining component 252 may provide means for determining, at the UE, a synchronization signal priority level.

At block 820, the method 800 may include determining a number of resources in a synchronization signal period on which to transmit a direct link synchronization signal block from the UE based on the synchronization signal priority level. In an aspect, for example, the direct link synchronization component 142 may execute the resource component 254 to determine the number of resources 720 in the synchronization signal period 710 on which to transmit a D-SSB 730 from the UE 104 based on the synchronization signal priority level. For example, at sub-block 822, the block 820 may include determining a greater number of resources for a first priority level having a higher priority than a second priority level. For instance, the resource component 254 may determine a greater number of resources (e.g., 4 or 8) for a first priority level (e.g., 0 or 1) having a higher priority than a second priority level (e.g., priority level greater than or equal to 2). In an aspect, the resource component 254 may include a mapping from each priority level to a corresponding number of resources. Accordingly, the UE 104 and/or the processors 212 executing the direct link synchronization component 142 and/or the resource component 254 may provide means for determining a number of resources in a synchronization signal period on which to transmit a direct link synchronization signal block from the UE based on the synchronization signal priority level.

In block 830, the method 800 may optionally include selecting a subset of resources in the synchronization signal period, the subset of resources including the number of resources on which to transmit the direct link synchronization signal block. For example, the direct link synchronization component 142 may execute the resource component 254 to select a subset of resources 720 in the synchronization signal period 710, the subset of resources 720 including the number of resources on which to transmit the D-SSB 730. For example, at sub-block 832, the block 830 may include randomly selecting the subset of resources. For instance, the resource component 254 may randomly select the subset of resources. In another example, at sub-block 834, the block 830 may include selecting the subset of resources based on synchronization signals detected in the synchronization signal period or in one or more previous synchronization signal periods. For instance, the resource component 254 may select the subset of resources based on synchronization signals detected in one or more previous synchronization signal periods. The resource component 254 may select the subset based on a congestion level (e.g., RSSI) of the resources 720 in the one or more previous synchronization signal periods or based on an SLSSID received in the resources 720 in the one or more previous synchronization signal periods. In a third example, at block 836, the block 830 may include selecting the subset of resources based on the synchronization signal priority level. For instance, the resource component 254 may select the subset of resources based on the synchronization signal priority level. The mapping from priority level to number of resources may specify the particular resources 720 for the priority level. For example, the mapping may include a resource pattern that defines a respective subset of resources associated with each of the plurality of synchronization signal priority levels. Accordingly, the UE 104 and/or the processors 212 executing the direct link synchronization component 142 and/or the resource component 254 may provide means for selecting a subset of resources in the synchronization signal period.

In block 840, the method 800 may include transmitting, by the UE, the direct link synchronization signal block on the number of resources. In an aspect, for example, the direct link synchronization component 142 may execute the transmitting component 256 and/or control the transceiver 202 or transmitter 208 to transmit, by the UE 104, the D-SSB 730 on the number of resources. For example, at sub-block 842, the block 840 may include transmitting an S-PSS, an S-SSS, and a PSBCH. For instance, the transmitting component 256, transceiver 202, and/or transmitter 208 may transmit the S-PSS 734, the S-SSS 736, and the PSBCH 732. In an aspect, at sub-block 844, the block 840 may include indicating indices corresponding to the subset of resources. For example, the transmitting component 256 may configure the PSBCH 732 to indicate the subset of resources, or the SLSSID may indicate the subset of resources (e.g., by indicating a priority level). A UE receiving the D-SSB 730 may use the indicated subset of resources to combine multiple D-SSB 730 for greater reliability. Accordingly, the UE 104, the transceiver 202, the transmitter 208 and/or the processors 212 executing the direct link synchronization component 142 and/or the transmitting component 256 may provide means for transmitting, by the UE, the direct link synchronization signal block on the number of resources.

Figure 9:
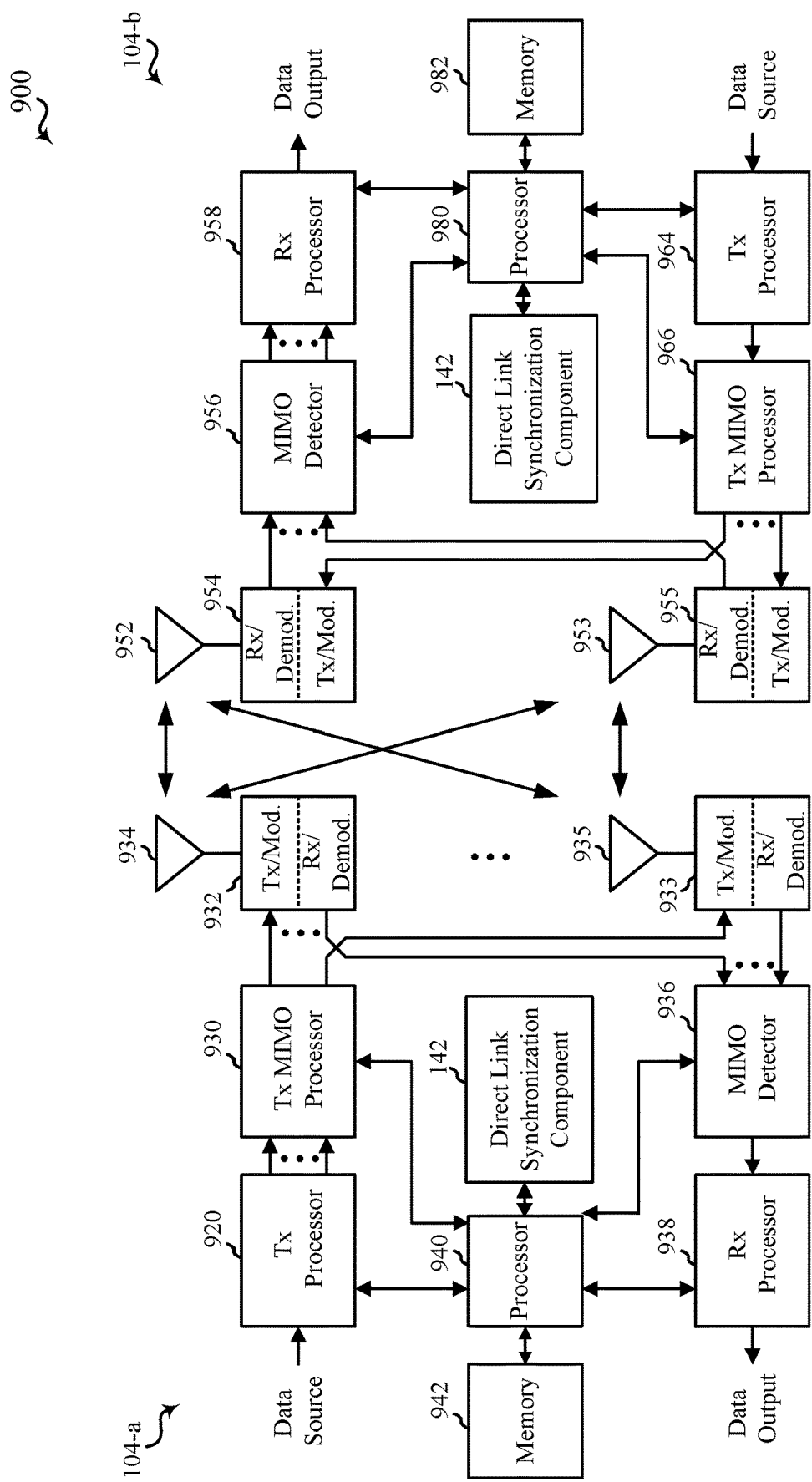
FIG. 9 is a block diagram illustrating an example of a MIMO communication system including a base station and a UE, in accordance with various aspects of the present disclosure.

FIG. 9 is a block diagram of a MIMO communication system 900 including UEs 104-a, 104-b. The MIMO communication system 900 may illustrate aspects of the wireless communication access network 100 described with reference to FIG. 1. The UE 104-a may be an example of aspects of the UE 104 described with reference to FIGS. 1-2. The UE 104-a may be equipped with antennas 934 and 935, and the UE 104-b may be equipped with antennas 952 and 953. In the MIMO communication system 900, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104-b may be an example of aspects of the UEs 104 described with reference to FIGS. 1-2. At the UE 104-b, the UE antennas 952 and 953 may receive the signals from the UE 104-a (e.g., over a direct link) and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104-b to a data output, and provide decoded control information to a processor 980, or memory 982.

The processor 980 may in some cases execute stored instructions to instantiate a direct link synchronization component 142 (see e.g., FIGS. 1 and 2).

At the UE 104-b, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the UE 104-a in accordance with the communication parameters received from the UE 104-a. At the UE 104-a, the signals from the UE 104-b may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a direct link synchronization component 142 (see e.g., FIGS. 1 and 2).

The components of the UEs 104-a, 104-b may, individually or collectively, be implemented with one or more ASICs adapted to perform some or all of the applicable functions in hardware. Each of the noted modules may be a means for performing one or more functions related to operation of the MIMO communication system 900. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Some Further Example Implementations

An example method of wireless communications, comprising: determining, at a user equipment (UE), a synchronization signal priority level; determining a number of resources in a synchronization signal period on which to transmit a direct link synchronization signal block from the UE based on the synchronization signal priority level; and transmitting, by the UE, the direct link synchronization signal block on the number of resources.

The above example method, wherein determining the number of resources in the synchronization signal period on which to transmit the direct link synchronization signal block comprises determining a greater number of resources for a first priority level having a higher priority than a second priority level.

Any of the above example methods, further comprising selecting a subset of resources in the synchronization signal period, the subset of resources including the number of resources on which to transmit the direct link synchronization signal block.

Any of the above example methods, wherein selecting the subset of resources comprises randomly selecting the subset of resources.

Any of the above example methods, wherein selecting the subset of resources comprises selecting the subset of resources based on synchronization signals detected in one or more previous synchronization signal periods.

Any of the above example methods, wherein selecting the subset of resources comprises selecting the subset of resources based on the synchronization signal priority level.

Any of the above example methods, wherein a resource pattern that defines a respective subset of resources is associated with each of a plurality of synchronization signal priority levels.

Any of the above example methods, wherein transmitting the direct link synchronization signal block on the number of resources comprises indicating indices corresponding to the subset of resources.

Any of the above example methods, wherein determining the synchronization signal priority level comprises determining a synchronization status according to a basis of synchronization of the UE.

Any of the above example methods, wherein the synchronization status is one of: directly synchronized to a base station or a satellite system; directly synchronized to a road side unit; directly synchronized to another UE that is directly synchronized to a base station or a satellite system; directly synchronized to another UE that is indirectly synchronized to a base station or a satellite system; directly synchronized to another UE that transmits a self-generated synchronization signal; or transmitting a self-generated synchronization signal.

Any of the above example methods, wherein determining the synchronization signal priority level comprises determining, based on a received synchronization signal, a number of hops from an original synchronization signal.

Any of the above example methods, further comprising generating a self-generated synchronization signal in response to the number of hops indicated by any received synchronization signal exceeding a threshold, the self-generated synchronization signal including a defined number of hops indicating that the self-generated synchronization signal is self-generated, the defined number of hops being greater than the threshold.

Any of the above example methods, wherein transmitting the direct link synchronization signal block on the number of resources comprises transmitting a sidelink primary synchronization signal, a sidelink secondary synchronization signal, and a physical sidelink broadcast channel (PSBCH), wherein the sidelink secondary synchronization signal indicates a sidelink synchronization signal identifier (SLSSID).

Any of the above example methods, wherein a combination of the sidelink primary synchronization signal and the sidelink secondary synchronization signal indicates the SLSSID.

Any of the above example methods, wherein the direct link synchronization signal block uses the same SLSSID as another direct link synchronization signal block having the same priority level, having a same original synchronization source, or transmitting in a same D-SSB resource.

Any of the above example methods, wherein the PSBCH is the same in each of the number of resources in the synchronization signal period.

Any of the above example methods, wherein the PSBCH is the same as a second PSBCH transmitted by a second UE with the same priority level.

Any of the above example methods, wherein the PSBCH in at least one resource of the number of resources is the same as a second PSBCH transmitted by a second UE on the at least one resource.

Any of the above example methods, further comprising receiving a direct link synchronization signal block from another UE, wherein determining the synchronization signal priority level is based on the received direct link synchronization signal block.

Any of the above example methods, wherein receiving the direct link synchronization signal block comprises receiving multiple direct link synchronization signal blocks and combining the received direct link synchronization signal blocks.

Any of the above example methods, further comprising receiving a downlink synchronization signal from a base station or global navigation satellite system, wherein determining the synchronization signal priority level is based on the received downlink synchronization signal.

A first example apparatus for wireless communication, comprising: a transceiver;

a memory configured to store instructions; and one or more processors communicatively coupled with the transceiver and the memory, wherein the one or more processors are configured to execute the instructions to: determine, at a user equipment (UE), a synchronization signal priority level; determine a number of resources in a synchronization signal period on which to transmit a direct link synchronization signal block from the UE based on the synchronization signal priority level; and transmit, from the UE via the transceiver, the direct link synchronization signal block on the number of resources.

The above first example apparatus, wherein the one or more processors are configured to perform any of the above example methods.

A second example apparatus for wireless communication, comprising: means for determining, at a user equipment (UE), a synchronization signal priority level; means for determining a number of resources in a synchronization signal period on which to transmit a direct link synchronization signal block from the UE based on the synchronization signal priority level; and means for transmitting, by the UE, the direct link synchronization signal block on the number of resources.

The above second example apparatus further comprising means for performing any of the above example methods.

An example non-transitory computer-readable medium, comprising code executable by one or more processors to: determine, at a user equipment (UE), a synchronization signal priority level; determine a number of resources in a synchronization signal period on which to transmit a direct link synchronization signal block from the UE based on the synchronization signal priority level; and transmit, from the UE, the direct link synchronization signal block on the number of resources.

The above example non-transitory computer-readable medium comprising code for performing any of the above example methods.

What is claimed is:
1. A method of wireless communications, comprising:
determining, at a user equipment (UE), a synchronization signal priority level for a direct link synchronization signal block to be transmitted from the UE;
determining a number of resources in a synchronization signal period on which to transmit the direct link synchronization signal block from the UE based on the synchronization signal priority level, wherein determining the number of resources in the synchronization signal period on which to transmit the direct link synchronization signal block comprises determining a greater number of resources for a first priority level having a higher priority than a second priority level; and
transmitting, by the UE, the direct link synchronization signal block on the number of resources.

2. The method of claim 1, wherein transmitting, by the UE, the direct link synchronization signal block on the number of resources comprises transmitting a same physical sidelink broadcast channel in each of the number of resources within the synchronization signal period.

3. The method of claim 1, further comprising selecting a subset of resources in the synchronization signal period, the subset of resources including the number of resources on which to transmit the direct link synchronization signal block.

4. The method of claim 3, wherein selecting the subset of resources comprises randomly selecting the subset of resources.

5. The method of claim 3, wherein selecting the subset of resources comprises selecting the subset of resources based on synchronization signals detected in the synchronization signal period or in one or more previous synchronization signal periods.

6. The method of claim 3, wherein selecting the subset of resources comprises selecting the subset of resources based on the synchronization signal priority level.

7. The method of claim 6, wherein a resource pattern that defines a respective subset of resources is associated with each of a plurality of synchronization signal priority levels.

8. The method of claim 3, wherein transmitting the direct link synchronization signal block on the number of resources comprises indicating indices corresponding to the subset of resources.

9. The method of claim 1, wherein determining the synchronization signal priority level comprises determining a synchronization status according to a basis of synchronization of the UE.

10. The method of claim 9, wherein the synchronization status is one of:
directly synchronized to a base station;
directly synchronized to a satellite system;
directly synchronized to a road side unit;
directly synchronized to another UE that is directly synchronized to a base station or a satellite system;
directly synchronized to another UE that is indirectly synchronized to a base station or a satellite system;
directly synchronized to another UE that transmits a self-generated synchronization signal; or
transmitting a self-generated synchronization signal.

11. The method of claim 1, wherein determining the synchronization signal priority level comprises determining, based on a received synchronization signal, a number of hops from an original synchronization signal.

12. The method of claim 11, further comprising generating a self-generated synchronization signal in response to the number of hops indicated by any received synchronization signal exceeding a threshold, the self-generated synchronization signal including a defined number of hops indicating that the self-generated synchronization signal is self-generated, the defined number of hops being greater than the threshold.

13. The method of claim 1, wherein transmitting the direct link synchronization signal block on the number of resources comprises transmitting a sidelink primary synchronization signal, a sidelink secondary synchronization signal, and a physical sidelink broadcast channel (PSBCH), wherein the sidelink secondary synchronization signal indicates a sidelink synchronization signal identifier (SLSSID).

14. The method of claim 13, wherein a combination of the sidelink primary synchronization signal and the sidelink secondary synchronization signal indicates the SLSSID.

15. The method of claim 13, wherein the direct link synchronization signal block uses the same SLSSID as another direct link synchronization signal block having the same priority level, having a same original synchronization source, or transmitting in a same resource.

16. The method of claim 13, wherein the PSBCH is the same in each of the number of resources in the synchronization signal period.

17. The method of claim 16, wherein the PSBCH is the same as a second PSBCH transmitted by a second UE with the same priority level.

18. The method of claim 16, wherein the PSBCH in at least one resource of the number of resources is the same as a second PSBCH transmitted by a second UE on the at least one resource.

19. The method of claim 1, further comprising receiving a direct link synchronization signal block from another UE, wherein determining the synchronization signal priority level is based on the received direct link synchronization signal block.

20. The method of claim 1, further comprising receiving multiple direct link synchronization signal blocks from multiple UEs and combining the received direct link synchronization signal blocks to synchronize with the multiple UEs.

21. The method of claim 1, further comprising receiving a downlink synchronization signal from a base station or global navigation satellite system, wherein determining the synchronization signal priority level is based on the received downlink synchronization signal.

22. An apparatus for wireless communication, comprising: a transceiver;
   a memory configured to store instructions; and
   one or more processors communicatively coupled with the transceiver and the memory, wherein the one or more processors are configured to execute the instructions to:
      determine, at a user equipment (UE), a synchronization signal priority level for a direct link synchronization signal block to be transmitted from the UE;
      determine a number of resources in a synchronization signal period on which to transmit the direct link synchronization signal block from the UE based on the synchronization signal priority level by determining a greater number of resources for a first priority level having a higher priority than a second priority level; and
      transmit, from the UE via the transceiver, the direct link synchronization signal block on the number of resources.

23. The apparatus of claim 22, wherein the one or more processors are configured to transmit a same physical sidelink broadcast channel in each of the number of resources within the synchronization signal period.

24. The apparatus of claim 22, wherein the one or more processors are configured to select a subset of resources in the synchronization signal period, the subset of resources including the number of resources on which to transmit the direct link synchronization signal block, wherein selecting the subset of resources comprises one of:
   randomly selecting the subset of resources;
   selecting the subset of resources based on synchronization signals detected in the synchronization signal period or in one or more previous synchronization signal periods; or
   selecting the subset of resources based on the synchronization signal priority level.

25. The apparatus of claim 22, wherein the one or more processors are configured to determine the synchronization signal priority level based on a synchronization status according to a basis of synchronization of the UE.

26. The apparatus of claim 22, wherein the one or more processors are configured to:
   determine, based on a received synchronization signal, a number of hops from an original synchronization signal; and
   generate a self-generated synchronization signal in response to the number of hops indicated by any received synchronization signal exceeding a threshold, the self-generated synchronization signal including a defined number of hops indicating that the self-generated synchronization signal is self-generated, the defined number of hops being greater than the threshold.

27. The apparatus of claim 22, wherein the one or more processors is configured transmit a sidelink primary synchronization signal, a sidelink secondary synchronization signal, and a physical sidelink broadcast channel (PSBCH), wherein the sidelink secondary synchronization signal indicates a sidelink synchronization signal identifier (SLSSID).

28. The apparatus of claim 22, wherein the one or more processors are configured to receive a direct link synchronization signal block from another UE, wherein the synchronization signal priority level is based on the received direct link synchronization signal block.

29. An apparatus for wireless communication, comprising:
   means for determining, at a user equipment (UE), a synchronization signal priority level for a direct link synchronization signal block to be transmitted from the UE;
   means for determining a number of resources in a synchronization signal period on which to transmit the direct link synchronization signal block from the UE based on the synchronization signal priority level, wherein the means for determining the number of resources in the synchronization signal period on which to transmit the direct link synchronization signal block is configured to determine a greater number of resources for a first priority level having a higher priority than a second priority level; and
   means for transmitting, by the UE, the direct link synchronization signal block on the number of resources.

30. A non-transitory computer-readable medium, comprising code executable by one or more processors to:
   determine, at a user equipment (UE), a synchronization signal priority level for a direct link synchronization signal block to be transmitted from the UE;

determine a number of resources in a synchronization signal period on which to transmit the direct link synchronization signal block from the UE based on the synchronization signal priority level, wherein the code to determine the number of resources in the synchronization signal period on which to transmit the direct link synchronization signal block comprises code to determine a greater number of resources for a first priority level having a higher priority than a second priority level; and transmit, from the UE, the direct link synchronization signal block on the number of resources.

\* \* \* \* \*